United States Patent
Hayashi et al.

(10) Patent No.: US 6,358,648 B2
(45) Date of Patent: *Mar. 19, 2002

(54) NICKEL ELECTRODE ACTIVE MATERIAL FOR ALKALINE STORAGE BATTERIES AND NICKEL ELECTRODE USING THE SAME

(75) Inventors: Kiyoshi Hayashi; Nobuyasu Morishita; Munehisa Ikoma, all of Toyohashi (JP)

(73) Assignee: Matsushita Electric Industrial Co., Ltd., Osaka-Fu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/255,583

(22) Filed: Feb. 22, 1999

(30) Foreign Application Priority Data

Feb. 23, 1998 (JP) .............................. 10-040704

(51) Int. Cl.[7] .......................... H01M 4/32; H01M 4/26; H01M 4/42; H01M 4/44; H01M 4/52
(52) U.S. Cl. ...................... 429/223; 29/623.1; 429/222; 429/229; 429/231.3; 429/231.6
(58) Field of Search .................. 429/223, 222, 429/229, 231.3, 231.6; 29/623.1, 623.5

(56) References Cited

U.S. PATENT DOCUMENTS

| | | | | |
|---|---|---|---|---|
| 3,657,013 A | * | 4/1972 | Melin | |
| 5,281,494 A | * | 1/1994 | Ettel et al. | 429/223 |
| 5,660,952 A | * | 8/1997 | Yano et al. | 429/223 |
| 5,879,835 A | * | 3/1999 | Kawase et al. | 429/223 |

FOREIGN PATENT DOCUMENTS

| | | |
|---|---|---|
| JP | 04-126358 A | 4/1992 |
| JP | 04-248973 A | 9/1992 |
| JP | 06-104565 A | 4/1994 |

\* cited by examiner

Primary Examiner—Carol Chaney
Assistant Examiner—Tracy Dove
(74) Attorney, Agent, or Firm—Akin, Gump, Strauss, Hauer & Feld, L.L.P.

(57) ABSTRACT

Disclosed is an active material for constituting a nickel electrode for alkaline storage batteries which has a high utilization at high ambient temperatures and therefore realizes a battery of higher energy density and a longer cycle life. The nickel electrode active material comprises a nickel hydroxide powder prepared from nickel sulfate and contains $SO_4^{2-}$ at 0.4 wt % or less in the crystal of the powder. The nickel hydroxide is preferably solid solution nickel hydroxide incorporating therein at least one element selected from the group consisting of cobalt, cadmium, zinc and magnesium.

5 Claims, 6 Drawing Sheets

NICKEL ELECTRODE ACTIVE MATERIAL FOR ALKALINE STORAGE BATTERIES AND NICKEL ELECTRODE USING THE SAME

BACKGROUND OF THE INVENTION

The present invention relates to an active material for constituting a nickel electrode for use in an alkaline storage battery such as nickel-metal hydride storage battery, nickel-cadmium storage battery and so on, and a nickel positive electrode using the same.

With the current rapid and wide spread of information equipment such as portable phone, PHS, notebook-type personal computer, etc., there is a serious demand for a secondary battery that has a high energy density and exhibits excellent performance as a battery even at high ambient temperatures. There has been a demand for the development of a novel secondary battery with a high energy density as a power source for electric vehicles, as well as a battery which is suited for use in a wide range of ambient temperatures. In order to answer such demand, a provision of a high capacity to the nickel-cadmium storage battery using a conventional sintered nickel positive electrode has been realized in the field of nickel-cadmium storage battery, and a nickel-cadmium storage battery having a high energy density including a foamed metal nickel positive electrode which has a 30 to 60% higher capacity than the former electrode has been developed. Furthermore, a nickel-metal hydride battery having a higher capacity than the nickel-cadmium storage battery which includes a hydrogen storage alloy as the negative electrode has also been developed. This nickel-metal hydride storage battery has a 2-fold or higher capacity than the nickel-cadmium storage battery using the sintered nickel positive electrode.

The above-noted various high capacity alkaline storage batteries include a sintered porous nickel substrate, a three-dimensional foamed porous nickel substrate of high porosity (90% or more) or a porous nickel fiber substrate being filled with a nickel hydroxide powder as an active material at a high density. The use of such porous substrates of high porosity has led to improvements of the energy density: Compared to 400 to 500 mAh/cm$^3$ of the conventional sintered nickel positive electrode, the recent sintered nickel positive electrode affords 450 to 500 mAh/cm3 and the foamed metal nickel positive electrode affords 550 to 650 mAh/cm$^3$.

However, the above-mentioned nickel positive electrodes have a common drawback: the energy density is high around room temperature but low at high ambient temperatures. This may be because when charged at high ambient temperature, these electrodes are liable to evolve oxygen upon charge of nickel hydroxide to nickel oxyhydroxide. In other words, oxygen evolution at the positive electrode inhibits sufficient charge of nickel hydroxide to nickel oxyhydroxide during charge, leading to poor utilization of the active material nickel hydroxide.

The following are proposed methods for solving the above-mentioned problem.

(1) Add a cadmium oxide powder or a cadmium hydroxide powder to the positive electrode;
(2) Incorporate a cadmium oxide in a nickel hydroxide powder (see Japanese Laid-Open Patent Publication No. Sho 61-104565); and
(3) Incorporate a compound of yttrium, indium, antimony, barium or beryllium in the positive electrode (see Japanese Laid-Open Patent Publication No. Hei 4-248973).

The methods (1) and (2) are intended to improve the utilization of nickel hydroxide active material at high ambient temperature by the presence of a cadmium oxide inside or in close contact with a nickel hydroxide powder. These methods can best utilize 80% or so of the nickel hydroxide active material at high ambient temperature. In order to further increase the utilization of nickel hydroxide at high ambient temperature, there is a need to increase the content of cadmium oxide in the nickel hydroxide or in the nickel positive electrode. However, there is a problem that increased content of cadmium oxide improves the utilization of nickel hydroxide at high ambient temperature to as high as 90% or so, but adversely reduces its utilization around room temperature.

From the aspect of current issue of environmental pollution, nickel-metal hydride storage battery which is free of heavy metal cadmium has been noted recently. Therefore, the use of nickel positive electrode containing a cadmium oxide is not suited for nickel-metal hydride storage battery.

The last method (3) adsorbs a compound of yttrium, indium, antimony, etc. on the surface of nickel oxide active material, expecting the following effects: (i) an elevation in oxygen evolution overvoltage as a competitive reaction in response to charge at high ambient temperatures, (ii) an increase in charge efficiency, that is, oxidation of nickel hydroxide to nickel oxyhydroxide, and (iii) an improvement of utilization at high ambient temperatures. However, simple application of this method only does not offer those expected effects due to non-homogeneous distribution of the additive in the active material paste or others. In order to have prominent effects, the use of additive in a large amount becomes mandatory, but this hinders realization of a high capacity battery.

BRIEF SUMMARY OF THE INVENTION

The object of the present invention is to provide a nickel hydroxide active material for use in nickel positive electrode that can solve the above-mentioned problems and offer an alkaline storage battery having a higher capacity and a longer cycle life.

The present invention is based on the discovery from an experiment focusing on the fact that the amount of impurities contained in a nickel hydroxide active material powder, particularly the impurity of sulfate ion ($SO_4^{2-}$) present in the nickel hydroxide powder obtained from nickel sulfate plays a significant role in determining electrode characteristics, and that regulation of the amount of sulfate ion as an impurity can improve the charge efficiency of nickel hydroxide active material at high temperatures and is effective for elongating the cycle life of the resultant battery.

The present invention provides an active material for constituting a nickel electrode comprising a nickel hydroxide powder formed from nickel sulfate wherein the content of impurity $SO_4^{2-}$ in the crystal of nickel hydroxide is 0.4 wt % or less (hereinafter wt % is represented by % simply).

The nickel hydroxide used here is preferably solid solution nickel hydroxide incorporating therein at least one element selected from the group consisting of cobalt, cadmium, zinc and magnesium.

The present invention can improve the utilization of positive electrode active material at high ambient temperatures and increase the filling amount of the nickel hydroxide by reducing the conventional amount of additive. The present invention therefore can provide a high performance alkaline storage battery operable in a wide range of ambient temperature.

DETAILED DESCRIPTION OF THE INVENTION

Nickel hydroxide used in the present invention can be synthesized by reacting an aqueous nickel sulfate solution with an alkali such as sodium hydroxide. Preliminary preparation of an aqueous nickel sulfate solution containing ammonium as a complex forming agent is desirable. In preparation of solid solution nickel hydroxide incorporating therein an element such as cobalt, the usual method adds a salt of incorporating element, such as cobalt sulfate, to the aqueous nickel sulfate solution. Removal of the sulfate ion in the nickel hydroxide synthesized from the starting material nickel sulfate is successfully achieved by treating the resultant nickel hydroxide with an aqueous alkaline solution such as sodium hydroxide. The degree or extent of removal of the sulfate ion can be controlled by adjusting pH of the aqueous alkaline solution used, and duration and times of alkali treatment.

If the nickel hydroxide powder thus obtained is reduced in amount of $SO_4^{2-}$ in the crystal, it can also be reduced in disorder of the crystal and can have uniform crystals, which leads to homogeneous electrochemical reaction of the nickel hydroxide in response to charge and discharge. Uniform crystal growth is considered to reduce the number of defective or disordered crystal, contributing to improvement of conductivity of nickel hydroxide.

Figure 1:
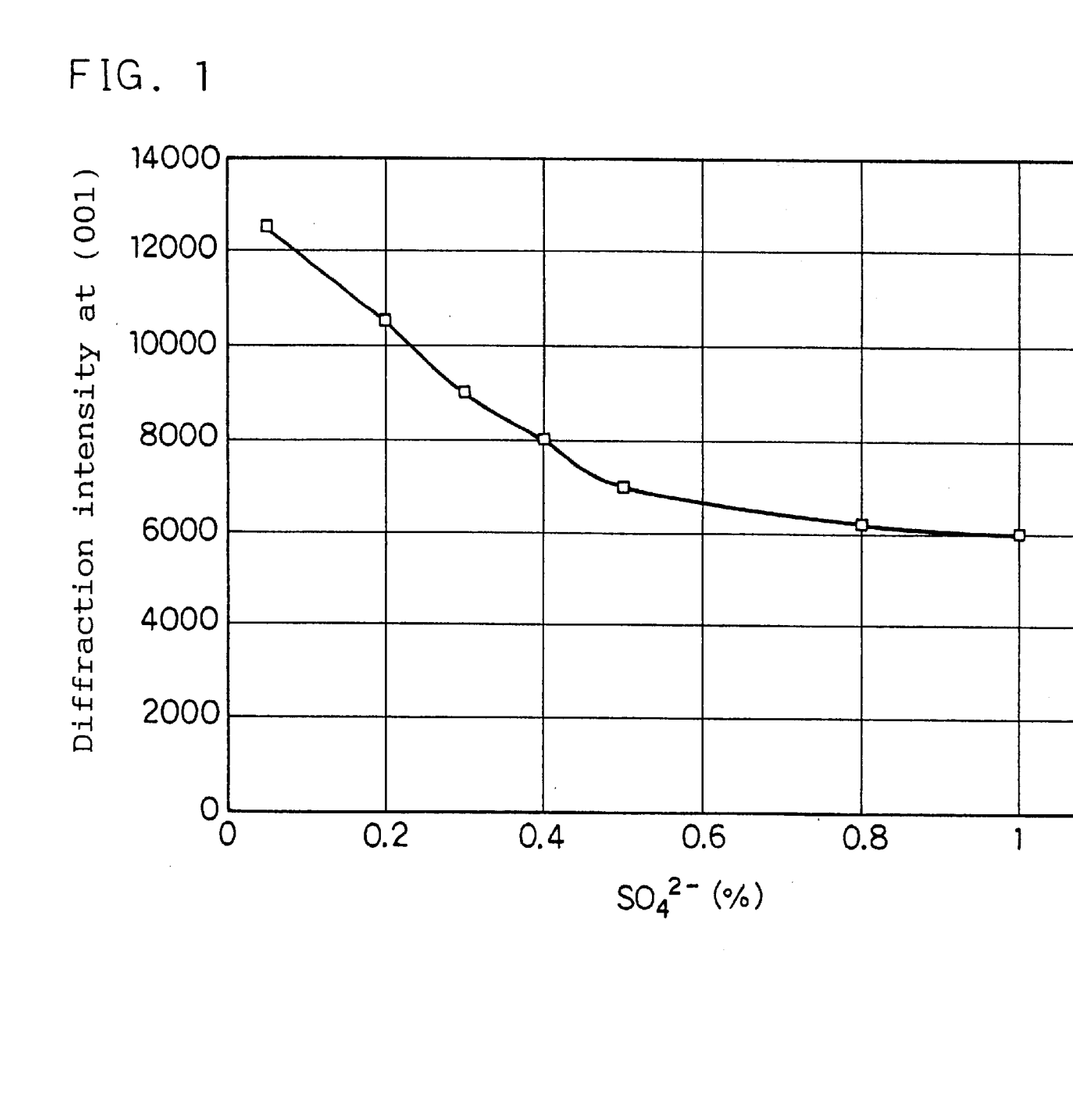
FIG. 1 is a graph illustrating the correlation between the content of $SO_4^{2-}$ in the nickel hydroxide and diffraction intensity at (001).
Figure 2:
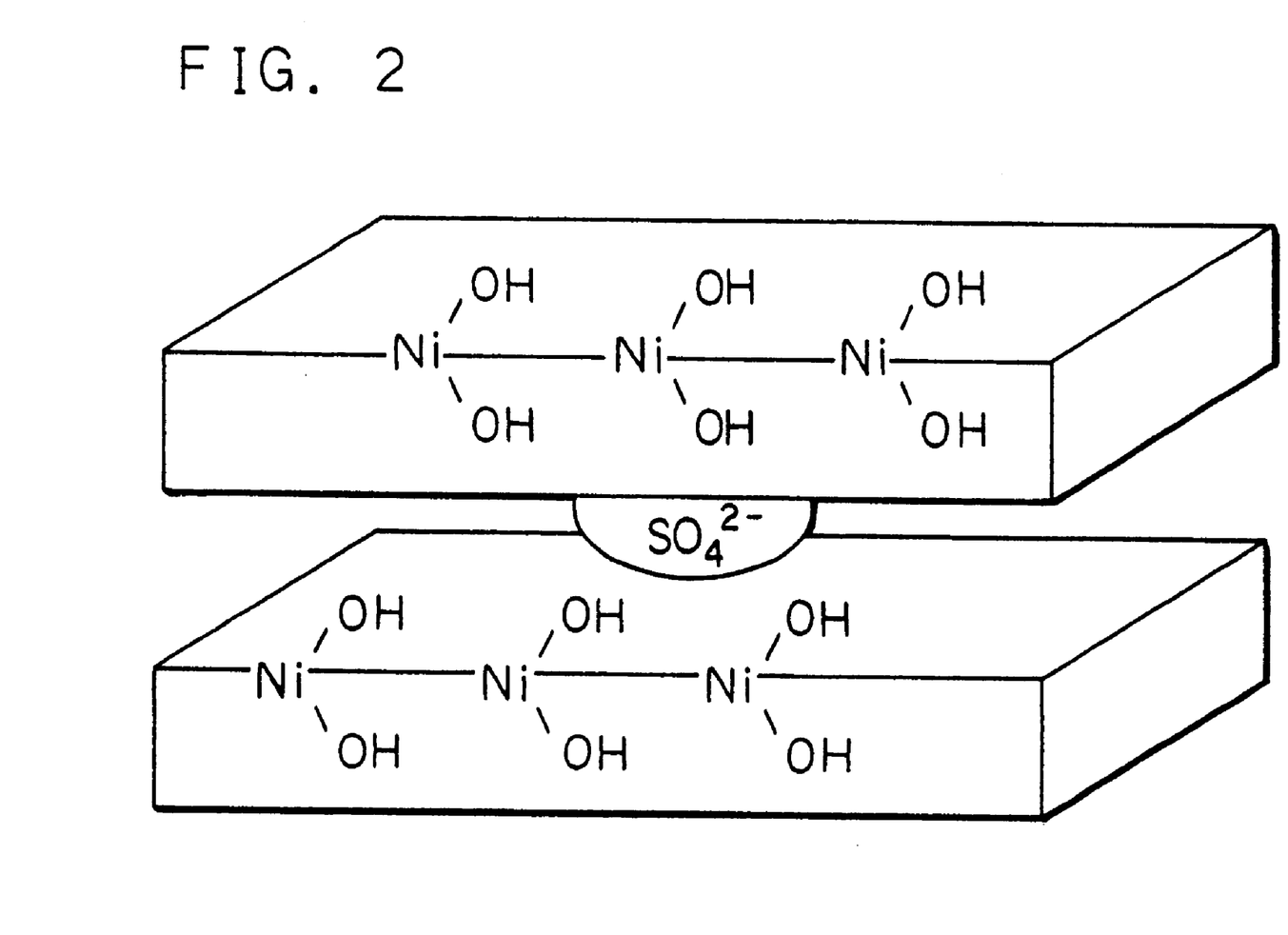
FIG. 2 is a sketch illustrating a model crystal structure of nickel hydroxide.

FIG. 1 shows the correlation between the content of $SO_4^{2-}$ in the crystals and diffraction intensity at (001) in X-ray diffraction. As clearly seen from FIG. 1, nickel hydroxide powders having low contents of $SO_4^{2-}$ are increased in diffraction intensity at (001) and are decreased in disordered crystals along the (001) plane. FIG. 2 shows a sketch of a model crystal structure of nickel hydroxide. The $SO_4^{2-}$ is considered to essentially exist inside the nickel hydroxide crystals as shown in FIG. 2, and nickel hydroxide with reduced amounts of $SO_4^{2-}$ shows better crystal growth and more homogeneous crystal along the (001) plane than the conventional nickel hydroxide. As a result, number of disordered crystals decreases which improves the conductivity between the crystals of nickel hydroxide.

Furthermore, the reduction in number of disordered crystal suggests uniform progress of charge reaction of nickel hydroxide to nickel oxyhydroxide. Improved conductivity of nickel hydroxide and uniform charge reaction are particularly effective for suppressing the competitive reaction of oxygen evolution represented by the formula (2), which affects the charge efficiency of the active material at high ambient temperatures, against the charge reaction of nickel hydroxide to nickel oxyhydroxide represented by the formula (1). This in turn improves the charge efficiency. Uniform charge/discharge reaction is also effective for suppressing the production of undesirable γ-nickel oxyhydroxide upon overcharge of the active material and the expansion of the active material, which leads to elongation of cycle life of the resultant battery.

When nickel hydroxide is solid solution nickel hydroxide incorporating therein at least one element selected from the group consisting of cobalt, cadmium, zinc and magnesium, that nickel hydroxide can produce an elevated oxygen evolution overpotential by the intrinsic or synergistic effect of the incorporated element(s) thereby reducing oxygen evolution. As a result, the charge efficiency of nickel hydroxide at high ambient temperatures can be improved greatly. The use of such solid solution nickel hydroxide powder in accordance with the present invention realizes a long life alkaline storage battery that can be operated even in a wider range of ambient temperature.

In the following, the present invention will be described by way of concrete examples.

EXAMPLE 1

Nickel hydroxide used in this example was produced by mixing and stirring an aqueous nickel sulfate solution and an aqueous sodium hydroxide solution thereby depositing nickel hydroxide. In order to stabilize any metal ion such as nickel ion, the aqueous nickel sulfate solution contains ammonia as a complex forming agent.

Various nickel hydroxide materials produced under the same condition were subjected to alkali treatment with one of aqueous sodium hydroxide solutions having different pH values (alkali treatment) to remove anions such as sulfate ion in each nickel hydroxide material, washed with water and dried, and used in the experiment. pH values of the aqueous sodium hydroxide solution ranged from 13.0 to 14.0. At that time, the content of $SO_4^{2-}$ in the nickel hydroxide produced can be controlled by adjusting pH value of the alkaline solution, duration and times of alkali treatment. Nickel hydroxide with no alkali treatment contained 1.0 to 1.2% $SO^{42-}$ The nickel hydroxide powder thus produced was a sphere having a mean particle size of about 10 μm.

Table 1 lists the content of $SO_4^{2-}$ in each nickel hydroxide powder used in the experiment. The content of $SO_4^{2-}$ was determined by indirect measurement of sulfur (s) by ICP spectrometry and direct quantitation by ion chromatography. There was no discrepancy between the values based on ICP spectrometry and those by ion chromatography.

TABLE 1

| No. | $SO_4^{2-}$ content (%) |
|---|---|
| 1 | 0.05 |
| 2 | 0.2 |
| 3 | 0.3 |
| 4 | 0.4 |
| 5 | 0.5 |

TABLE 1-continued

| No. | $SO_4^{2-}$ content (%) |
|-----|-------------------------|
| 6   | 0.8                     |
| 7   | 1.0                     |

The nickel positive electrode used here was produced as follows:

Each of the nickel hydroxide powders as produced was mixed with a cobalt powder, a cobalt hydroxide powder and a zinc oxide powder in a weight ratio of 100:7:5:3. Water was added to the mixture and kneaded to make a paste, which was filled into a foamed porous nickel substrate having a porosity of 95% and a surface density of 450 g/cm$^2$, dried, pressed, and cut to a predetermined size (thickness 0.5 mm, width 35 mm, length 110 mm), and the nickel positive electrode thus produced had a theoretical capacity of 1,000 mAh.

Figure 3:
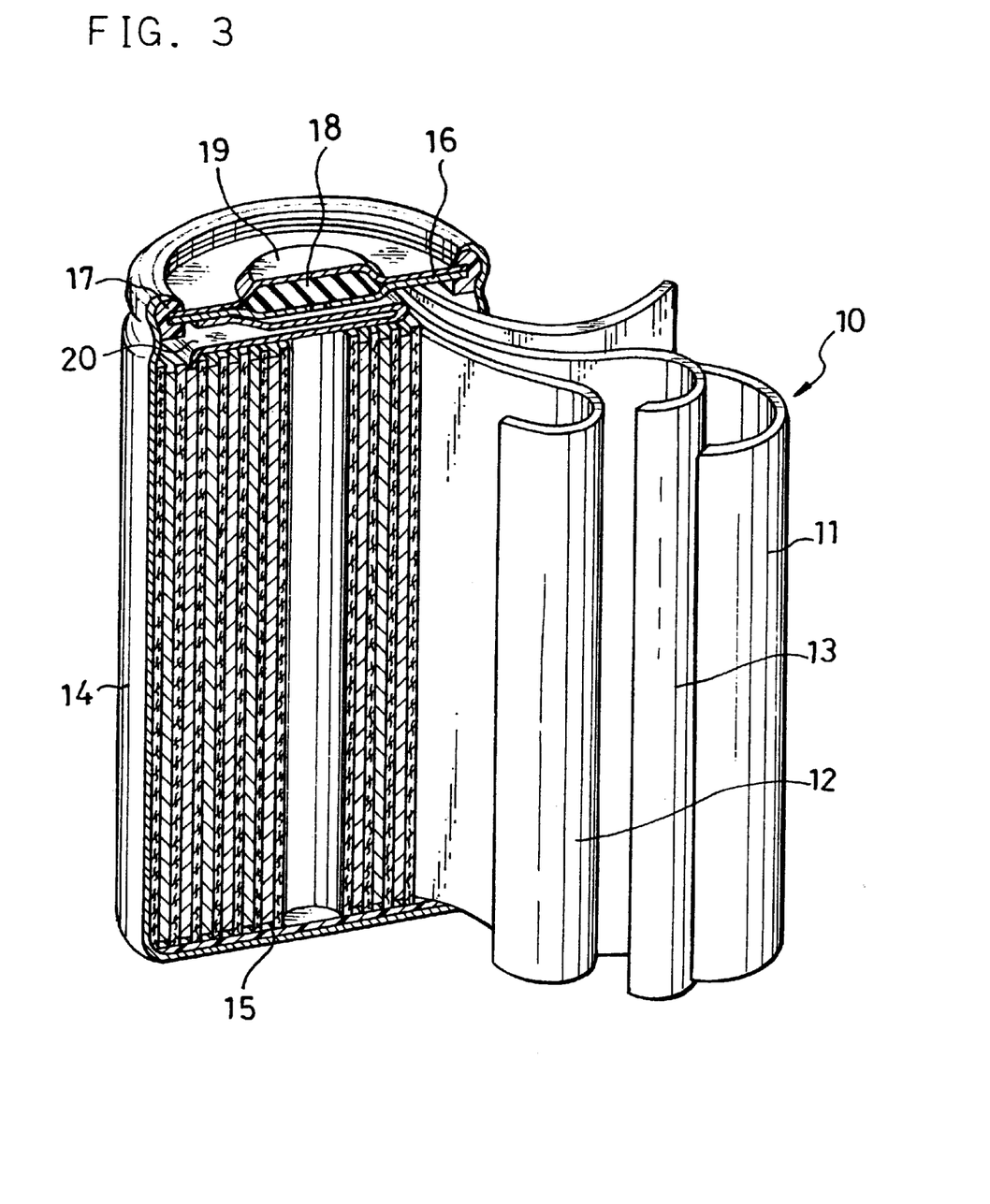
FIG. 3 is an exploded oblique cut view illustrating the essential parts of a nickel-metal hydride storage battery in one example of the present invention.

The positive electrode thus produced was used to produce a sealed nickel-metal hydride storage battery of AA size with a regulated capacity by the positive electrode (theoretical capacity: 1,000 mAh). The structure of this battery is shown in FIG. 3. In the figure, numeral 10 designates an electrode group. The electrode group is a spiral combination of a nickel positive electrode 12 produced in the above-mentioned manner and a negative electrode 11 of a hydrogen storage alloy represented by the formula MmNi$_{3.6}$Co$_{0.7}$Mn$_{0.4}$Al$_{0.3}$ where Mm is an abbreviation of Misch metal with a sulfonated polypropylene separator being interposed therebetween, and is accommodated in a case 14 as a negative terminal. After pouring an alkaline electrolyte (2.0 cm$^3$) prepared by dissolving lithium hydroxide at 20 g/l in an aqueous potassium hydroxide solution having a specific gravity of 1.3 over the electrode group, the case 14 was sealed with a sealing plate 16 mounted with a safety vent 18 and a terminal 19. Numeral 15 designates an insulating plate for insulating the case 14 from the electrode group, numeral 17 designates a gasket, and numeral 20 designates a positive current collector for electrically connecting the positive electrode 12 and the sealing plate 16.

Figure 4:
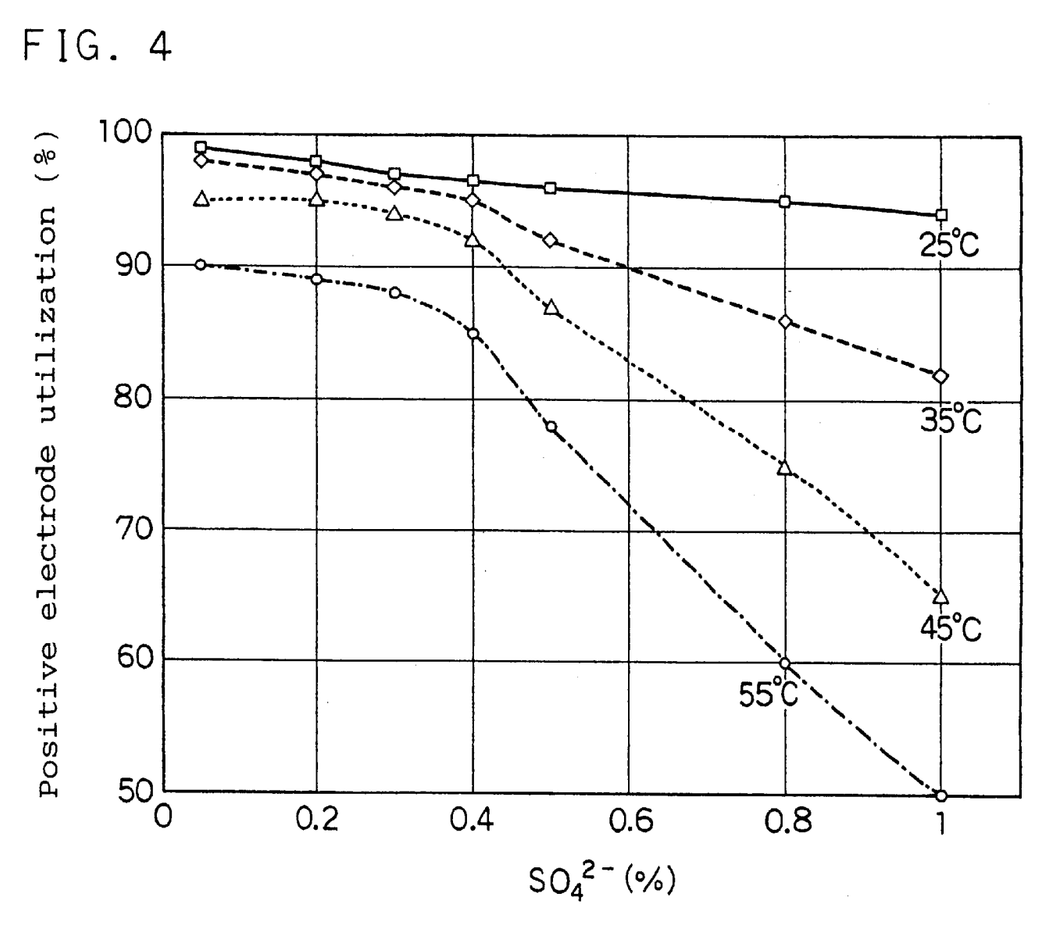
FIG. 4 is a graph illustrating the correlation between the content of $SO_4^{2-}$ in the nickel hydroxide and utilization of nickel positive electrode at various temperatures.

Batteries having one of the various positive electrodes produced in the above-mentioned manner were evaluated for their utilization of the positive electrode active material. Each battery was tested by consecutive charge and discharge cycles under the conditions of charge with a current of 0.1 C at ambient temperatures of 25, 35, 45 and 55 ° C. for 15 hours, followed by a 3-hour rest at an ambient temperature of 25° C. and subsequent discharge with a current of 0.2 C at the same ambient temperature of 25° C until the voltage drops to 1.0 V. The discharge capacity at each testing temperature was determined in each battery at the second cycle of the above-mentioned charge/rest/discharge cycle. Based on the discharge capacity at the second cycle, the correlation between the content of $SO_4^{2-}$ in the nickel hydroxide powder of the positive electrode and utilization of the positive electrode was analyzed, and the results are shown in FIG. 4. The utilization of the positive electrode was calculated using the following equation:

Positive electrode utilization (%)=(Discharge capacity (Ah))/
(Theoretical capacity of positive electrode (Ah))

As shown in FIG. 4, the utilization of nickel positive electrode at high ambient temperatures increases by reducing the content of $SO_4^{2-}$. The utilization at 35, 45 and 55° C. becomes stabilized particularly at an $S_4^{2-}$ content of 0.4% or less. When the content of $SO_4^{2-}$ is decreased to as low as 0.2% or less, the utilization is stabilized at a value around a constant value. Therefore, the effect of the present invention can be achieved when the content of $SO_4^{2-}$ is 0.4% or less, and an $SO_4^{2-}$ content as low as 0.2% or less is particularly effective.

Then, batteries No. 1, 4, 5 and 7 containing $SO_4^{2-}$ at the contents shown in Table 1 were tested by consecutive charge and discharge cycles under the conditions of charge at ambient temperatures of 25 and 45° C. with a current of 1 C for 1.3 hours and discharge with a current of 1 C until the voltage shows 1.0 V. Changes in discharge capacity with the cycles are shown in FIG. 5 and FIG. 6.

Figure 5:
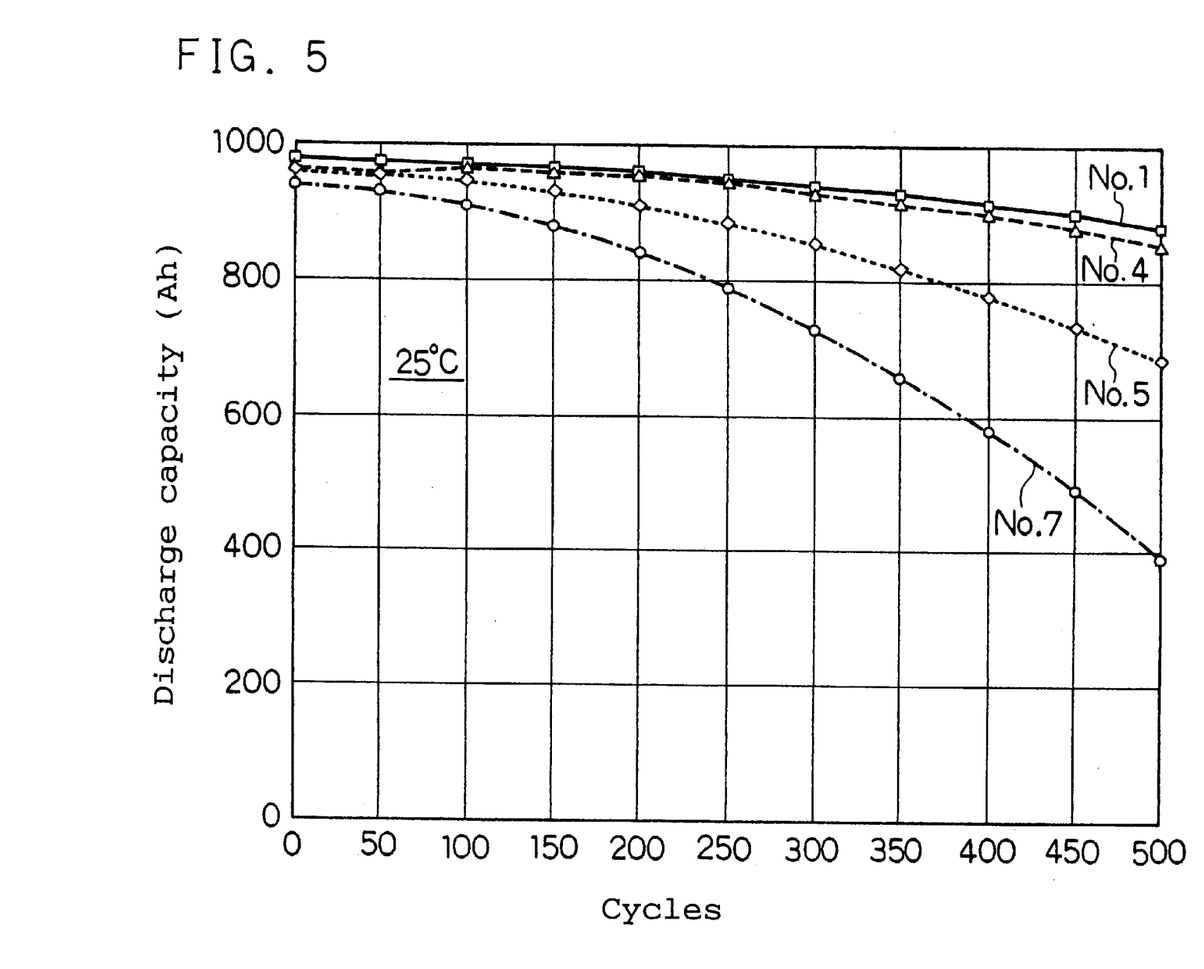
FIG. 5 is a graph illustrating changes in discharge capacity by charge/discharge cycles at an ambient temperature of 25° C. observed in batteries including various nickel positive electrodes in accordance with one example of the present invention.
Figure 6:
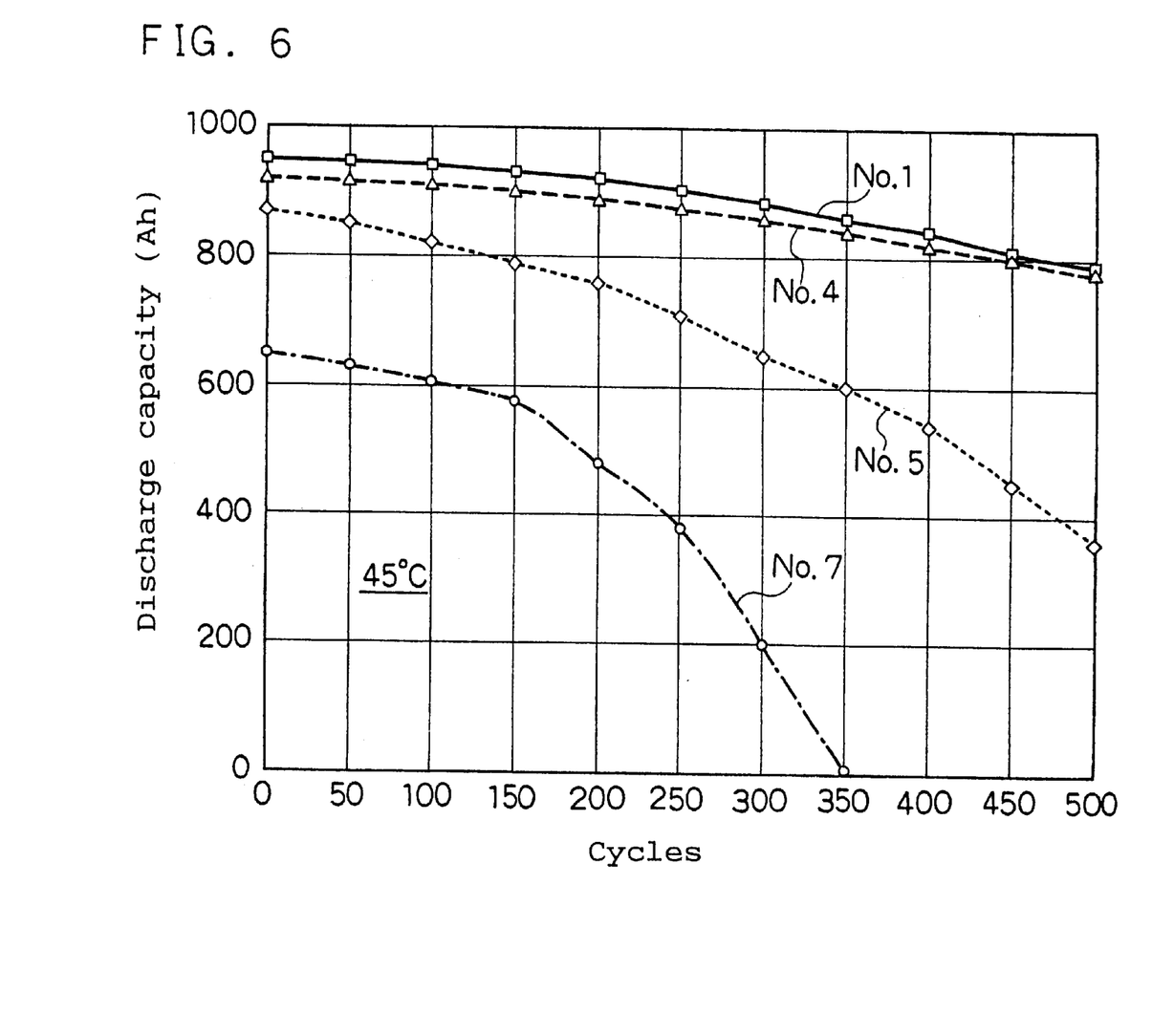
FIG. 6 is a graph illustrating changes in discharge capacity by charge/discharge cycles at an ambient temperature of 45° C. observed in batteries including various nickel positive electrodes in accordance with one example of the present invention.

As evident from FIG. 5 and FIG. 6, batteries No. 1 and 4 retained a high capacity even after 500 cycles at ambient temperatures of 25 and 45 ° C. These batteries underwent further cycles and retained a discharge capacity of 50% or more of their initial discharge capacity until 800 to 900 cycles. Batteries No. 5 and 7, on the other hand, were decreased in capacity gradually; the capacity decreased down to 50% or less of their initial discharge capacity after 200 to 400 cycles. These results may indicate that reductions of the impurity $SO_4^{2-}$ in the nickel hydroxide active material to 0.4% or less have led to decreases in the number of disordered crystals of the nickel hydroxide and uniform progress of oxidation and reduction of the nickel hydroxide by charge and discharge, thereby elongating the cycle life of the resultant batteries. As such, reduced content of $SO_4^{2-}$ to as low as 0.4% or less improves the charge efficiency at high ambient temperatures, realizing a long cycle life of the battery. In order to improve the positive electrode utilization, lesser contents of $SO_4^{2-}$ are more preferable; contents of 0.3% or less increases the positive electrode utilization to as high as 95% or more.

EXAMPLE 2

Spherical powders of solid solution nickel hydroxide incorporating therein one or two elements selected from the group consisting of cobalt, cadmium, zinc and magnesium were produced. Solid solution nickel hydroxide powders were produced in the same manner as in Example 1, except that a sulfate of one or two elements to be incorporated is dissolved in a similar aqueous nickel sulfate solution to that used in Example 1.The percentage of incorporated element (s) and the percentage of $SO_4^{2-}$ in the respective solid solution nickel hydroxide powders are shown in Table 2.

TABLE 2

| | Incorporated element(s) and impurity (%) | | | | |
|-----|----|----|----|----|-----------|
| No. | Co | Zn | Cd | Mg | $SO_4^{2-}$ |
| 11  | 0  | 0  | 0  | 0  | 0.30 |
| 12  | 1  | 0  | 0  | 0  | 0.27 |
| 13  | 0  | 1  | 0  | 0  | 0.32 |
| 14  | 0  | 0  | 1  | 0  | 0.31 |
| 15  | 0  | 0  | 0  | 1  | 0.30 |
| 16  | 0  | 0  | 0  | 0  | 0.28 |
| 17  | 1  | 1  | 0  | 0  | 0.25 |
| 18  | 1  | 0  | 1  | 0  | 0.32 |
| 19  | 1  | 0  | 0  | 1  | 0.30 |

These nickel hydroxide powders were mixed with a powder, a cobalt hydroxide powder and a zinc oxide in a weight ratio of 100:7:5:3, and using those mixtures thus produced, various positive electrodes were and fabricated into batteries for experiments in a manner similar to that in Example 1.

Those batteries were tested by consecutive and discharge cycles under the conditions of charge at ambient temperatures of 25, 35, 45 and 55° C. with a of 1 C for 1.3 hours and discharge at 1 C until voltage shows 1.0 V. When the discharge capacity eased by 50% of the initial capacity, then that battery was taken as ending its life as a battery. The cycle life in each battery thus examined is shown in Table 1

TABLE 3

| | Cycle life (cycles) | | | |
|---|---|---|---|---|
| No. | 25° C. | 35° C. | 45° C. | 55° C. |
| 11 | 900 | 760 | 650 | 455 |
| 12 | 980 | 850 | 720 | 550 |
| 13 | 975 | 840 | 715 | 530 |
| 14 | 990 | 860 | 725 | 555 |
| 15 | 950 | 855 | 730 | 550 |
| 16 | 955 | 860 | 720 | 540 |
| 17 | 960 | 835 | 710 | 530 |
| 18 | 975 | 845 | 705 | 520 |
| 19 | 980 | 860 | 720 | 520 |

Table 3 clearly shows that batteries having positive electrodes of solid solution nickel hydroxide incoporating therein one or more elements of cobalt, cadmium, zinc and magnesium are improved in cycle life at high ambient temperatures compared to those having positive electrodes of nickel hydroxide incorporating none of those elements.

By improvement of nickel hydroxide active material by incorporating therein certain elements, it is possible to produce a long life battery which can afford a stable capacity in a wide range of ambient temperature.

In the foregoing examples, although one or two of cobalt, cadmium, zinc and magnesium are incorporated in the solid solution nickel hydroxide powder of the present invention, solid solution nickel hydroxide incorporating therein three or more of these elements can also ensure an identical effect.

As discussed above, the present invention can provide a nickel positive electrode for use in alkaline storage battery which ensures a high capacity in a wide range of ambient temperatures and a long cycle life for the battery.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method of manufacturing a nickel electrode active material for alkaline storage batteries, the method comprising the steps of:
    a) forming a nickel hydroxide by combining an aqueous nickel sulfate solution and a first alkaline solution; and
    b) removing anions from the nickel hydroxide obtained in step (a) by treating the nickel hydroxide with a second alkaline solution having a pH of 13.0 to 14.0,
    wherein the content of sulfate ions in crystal of nickel hydroxide after completion of step (b) is 0.4 wt % or less.

2. A method of manufacturing a nickel electrode active material for alkaline storage batteries, the method comprising the steps of:
    a) forming a nickel hydroxide by combining an aqueous nickel sulfate solution and a first aqueous sodium hydroxide solution; and
    b) removing anions from the nickel hydroxide obtained in step (a) by treating the nickel hydroxide with a second sodium hydroxide solution having a pH of 13.0 to 14.0,
    wherein the content of sulfate ions in a crystal of nickel hydroxide after completion of step (b) is 0.4 wt % or less.

3. The method according to claim 2, wherein the nickel hydroxide formed is a solid solution nickel hydroxide and incorporates at least one element selected from the group consisting of cobalt, cadmium, zinc and magnesium.

4. A method of manufacturing a nickel positive electrode for alkaline storage batteries, the method comprising the steps of:
    preparing a nickel electrode active material by combining an aqueous nickel sulfate solution and a first aqueous sodium hydroxide solution to form nickel hydroxide;
    removing anions from the nickel hydroxide obtained by treating the nickel hydroxide with a second sodium hydroxide solution having a pH of 13.0 to 14.0;
    mixing the treated nickel hydroxide material from step (b) with a cobalt powder, a cobalt hydroxide powder and a zinc oxide powder to form a mixture; and
    filling the mixture produced in step (c) into a foamed porous nickel substrate to form the nickel positive electrode.

5. The method according to claim 4, wherein the nickel hydroxide prepared in step (a) is a solid solution nickel hydroxide and incorporates at least one element selected from the group consisting of cobalt, cadmium, zinc and magnesium.

* * * * *